United States Patent
Flori

(10) Patent No.: US 9,767,429 B2
(45) Date of Patent: Sep. 19, 2017

(54) PRODUCT INVENTORY INFORMATION SHARING SYSTEM AND METHOD

(71) Applicant: AmerisourceBergen Specialty Group, Frisco, TX (US)

(72) Inventor: Chris Flori, Dallas, TX (US)

(73) Assignee: ASD Specialty Healthcare, LLC, Frisco, TX (US)

( * ) Notice: Subject to any disclaimer, the term of this patent is extended or adjusted under 35 U.S.C. 154(b) by 228 days.

(21) Appl. No.: 13/720,604

(22) Filed: Dec. 19, 2012

(65) Prior Publication Data

US 2014/0172651 A1  Jun. 19, 2014

(51) Int. Cl.
*G06Q 10/08* (2012.01)

(52) U.S. Cl.
CPC .................. *G06Q 10/087* (2013.01)

(58) Field of Classification Search
CPC combination set(s) only.
See application file for complete search history.

(56) References Cited

U.S. PATENT DOCUMENTS

| | | | |
|---|---|---|---|
| 4,857,716 A | 8/1989 | Gombrich et al. | |
| 4,866,661 A | 9/1989 | de Prins | |
| 5,774,053 A | 6/1998 | Porter | |
| 5,936,527 A | 8/1999 | Isaacman et al. | |
| 5,963,134 A | 10/1999 | Bowers et al. | |
| 6,010,064 A | 1/2000 | Umeda et al. | |
| 6,195,645 B1 | 2/2001 | Itakura et al. | |
| 6,249,227 B1 | 6/2001 | Brady et al. | |
| 6,294,999 B1 | 9/2001 | Yarin et al. | |
| 6,323,782 B1 | 11/2001 | Stephens et al. | |
| 6,707,381 B1 | 3/2004 | Maloney | |
| 6,708,879 B2 | 3/2004 | Hunt | |
| 6,829,520 B1 | 12/2004 | Green | |
| 6,845,909 B2 | 1/2005 | Bong et al. | |
| 6,935,560 B2 | 8/2005 | Andreasson et al. | |
| 6,989,749 B2 | 1/2006 | Mohr | |
| 7,284,704 B2 | 10/2007 | Lubow | |

(Continued)

FOREIGN PATENT DOCUMENTS

| | | |
|---|---|---|
| WO | WO 03/073201 A3 | 9/2003 |
| WO | WO 2005/015510 A1 | 2/2005 |

(Continued)

OTHER PUBLICATIONS

Wolf Bielas, "RFID Tags Let Packages "Talk"," Aug. 1, 2004, 3 pages.

(Continued)

*Primary Examiner* — Luna Champagne

(57) ABSTRACT

A product inventory sharing system includes a product management device in communication with a server. The product management device is configured to store one or more product units each configured with a corresponding one or more RFID tags, and monitor an inventory of the product units by wirelessly detecting the RFID tags. The server is configured to periodically receive product information from the product management device, the product information comprising inventory data, store the product information, and transmit the product information to a network node associated with at least one vested entity associated with the product units.

21 Claims, 5 Drawing Sheets

(56) References Cited

U.S. PATENT DOCUMENTS

| | | | |
|---|---|---|---|
| 7,455,225 B1 | 11/2008 | Hadfield et al. | |
| 7,689,316 B1 | 3/2010 | Frederick | |
| 8,212,677 B2 * | 7/2012 | Ferguson | 340/572.3 |
| 8,738,177 B2 * | 5/2014 | van Ooyen et al. | 700/242 |
| 2002/0029575 A1 | 3/2002 | Okamoto | |
| 2002/0032582 A1 * | 3/2002 | Feeney et al. | 705/2 |
| 2003/0117281 A1 | 6/2003 | Sriharto et al. | |
| 2003/0120384 A1 | 6/2003 | Haitin et al. | |
| 2003/0136794 A1 | 7/2003 | Chirnomas | |
| 2003/0186032 A1 | 10/2003 | Rosenberger et al. | |
| 2004/0129779 A1 | 7/2004 | Kvalheim, Jr. | |
| 2004/0186620 A1 | 9/2004 | Chirnomas | |
| 2005/0021175 A1 * | 1/2005 | Bain | G06F 19/3462 700/236 |
| 2005/0267356 A1 | 12/2005 | Ramasubramanian et al. | |
| 2006/0173750 A1 | 8/2006 | Naley et al. | |
| 2006/0192001 A1 | 8/2006 | Shaffer et al. | |
| 2006/0259195 A1 | 11/2006 | Eliuk et al. | |
| 2007/0103304 A1 | 5/2007 | Newton et al. | |
| 2007/0145130 A1 * | 6/2007 | Danilewitz | 235/385 |
| 2007/0150382 A1 | 6/2007 | Danilewitz | |
| 2007/0272746 A1 | 11/2007 | Ortiz et al. | |
| 2008/0054007 A1 | 3/2008 | Mador | |
| 2008/0128498 A1 | 6/2008 | Fausak et al. | |
| 2008/0223936 A1 | 9/2008 | Mickle et al. | |
| 2009/0014458 A1 * | 1/2009 | Heffron | A61G 12/001 221/2 |
| 2010/0023346 A1 | 1/2010 | Paty | |
| 2010/0042437 A1 | 2/2010 | Levy et al. | |
| 2010/0280840 A1 | 11/2010 | Fukushi et al. | |
| 2011/0187549 A1 * | 8/2011 | Balasingam | 340/687 |
| 2011/0245630 A1 | 10/2011 | St. Pierre et al. | |
| 2012/0004770 A1 | 1/2012 | Ooyen et al. | |
| 2012/0203573 A1 * | 8/2012 | Mayer | G06F 19/3481 705/3 |
| 2014/0138440 A1 | 5/2014 | D'Ambrosio et al. | |
| 2014/0172651 A1 | 6/2014 | Flori | |
| 2014/0263636 A1 | 9/2014 | Jones et al. | |
| 2014/0288701 A1 | 9/2014 | Flori et al. | |

FOREIGN PATENT DOCUMENTS

| | | |
|---|---|---|
| WO | WO 2007/064816 A2 | 6/2007 |
| WO | WO 2008/000279 A1 | 1/2008 |

OTHER PUBLICATIONS

"The Smart Medicine Cabinet," Swiss Federal Institute of Technology Zurich, 1 page.

"Smart Medicine Cabinet," Swiss Federal Institute of Technology Zurich, Dec. 18, 2006, 3 pages.

1 to 1 Weekly, Sep. 20, 2004, People: Martha Rogers Ph.D., Carlson Marketing, Inc., 1 page.

Jonathan Collins, "RFID Cabinet Manages Medicine," RFID Journal, Aug. 12, 2004, 2 pages.

Hallie Forcinio, "The Business Value of RFID," Microsoft, Jan. 2006, 19 pages.

Notification of Transmittal of the International Search Report and the Written Opinion of the International Search Report dated Mar. 27, 2008 in PCT Application No. PCT/US06/4601 5 pages.

International Search Report dated May 6, 2014 in connection with International Patent Application No. PCT/US2013/076369, 3 pages.

Written Opinion of International Searching Authority dated May 6, 2014 in connection with International Patent Application No. PCT/US2013/076369, 6 pages.

Petition for Covered Business Method Patent Review of U.S. Pat. No. 8,285,607 under 35 USC 321, 37 CFR 42.304; 85 pages.

U.S. Office Action dated Dec. 29, 2008 in connection with U.S. Appl. No. 11/607,832; 6 pages.

U.S. Office Action dated Jul. 8, 2009 in connection with U.S. Appl. No. 11/607,832; 7 pages.

U.S. Office Action dated Sep. 9, 2014 in connection with U.S. Appl. No. 13/720,604; 11 pages.

Smyrlis, Lou. Canadian Transportation Logistics. May 2005. vol. 108, Iss 5, p17. Abstract attached (4 pages).

U.S. Office Action dated Sep. 9, 2014 in connection with U.S. Appl. No. 14/302,127; 10 pages.

U.S. Office Action dated Jan. 28, 2015 in connection with U.S. Appl. No. 14/302,127; 18 pages.

International Search Report dated Nov. 23, 2015 in connection with International Patent Application No. PCT/US2015/052686; 5 pages.

Written Opinion of the International Searching Authority dated Nov. 23, 2015 in connection with International Patent Application No. PCT/US2015/052686; 5 pages.

International Search Report and Written Opinion dated Jul. 30, 2015 in connection with International Application No. PCT/US2015/035373; 9 pages.

International Search Report and Written Opinion dated Sep. 30, 2015 in connection with International Application No. PCT/US2015/032730; 8 pages.

Non-Final Office Action dated Jul. 10, 2015 in conection with U.S. Appl. No. 13/647,737; 11 pages.

Non-Final Office Action dated Jul. 30, 2015 in conection with U.S. Appl. No. 14/302,127; 13 pages.

Non-Final Office Action dated Aug. 3, 2015 in connection with U.S. Appl. No. 14/738,733; 9 pages.

Non-Final Office Action dated Oct. 6, 2015 in conection with U.S. Appl. No. 14/738,561; 9 pages.

Non-Final Office Action dated Oct. 7, 2015 in conection with U.S. Appl. No. 14/738,684; 11 pages.

Non-Final Office Action dated Mar. 7, 2016 in connection with U.S. Appl. No. 14/498,831; 8 pages.

Final Office Action dated Mar. 1, 2016 in connection with U.S. Appl. No. 14/738,733; 11 pages.

Final Office Action dated Jan. 25, 2016 in connection with U.S. Appl. No. 14/302,127; 15 pages.

Non-Final Office Action dated Jan. 15, 2016 in connection with U.S. Appl. No. 13/647,737; 8 pages.

Final Office Action dated Apr. 21, 2016 in connection with U.S. Appl. No. 14/738,684; 11 pages.

Final Office Action dated Apr. 21, 2016 in connection with U.S. Appl. No. 14/738,561; 10 pages.

U.S. Office Action issued for U.S. Appl. No. 13/647,737 dated Jul. 22, 2016, 9 pgs.

* cited by examiner

PRODUCT INVENTORY INFORMATION SHARING SYSTEM AND METHOD

TECHNICAL FIELD

The present disclosure is generally related to inventory management and tracking systems, and more particularly, to a product inventory sharing system and method.

BACKGROUND

Product tracking is of importance to any manufacturing, distribution, or sales enterprise. It can be particularly important in the pharmaceutical area, where many products must be carefully identified and tracked from manufacture until administered to a patient. Typical known means of tracking pharmaceuticals involve manual record keeping and identifying products according to written labels. Inventory management and distribution also typically rely on a manual process of taking a physical inventory of product and manually ordering refills or restocking, while also eliminating product that is nearing or passed its expiry.

Another significant issue with pharmaceuticals is the high cost of maintaining an inventory of expensive drugs. Some drugs can cost several thousand dollars per dose, and be relatively rarely needed, but these same drugs, when needed, are needed immediately. Pre-purchasing and stocking such drugs is a great expense for pharmacies and hospitals. Further, because of the high cost of these drugs, managing and tracking each product becomes essential.

SUMMARY

According to one embodiment, a product inventory sharing system includes a product management device in communication with a server. The product management device is configured to store one or more product units each configured with a corresponding one or more RFID tags, and monitor an inventory of the product units by wirelessly detecting the RFID tags. The server is configured to periodically receive product information from the product management device, the product information comprising inventory data, store the product information, and transmit the product information to a network node associated with at least one vested entity associated with the product units.

According to another embodiment, a product inventory sharing method includes storing one or more product units each configured with a corresponding one or more RFID tags, and monitoring an inventory of the product units by wirelessly detecting the RFID tags. The method also includes periodically receiving product information from the product management device, the product information comprising inventory data, storing the product information, and transmitting the product information to a network node associated with at least one vested entity associated with the product units.

According to yet another embodiment, a product inventory sharing system includes a server configured to periodically receive product information, store the product information, and transmit the product information to a network node associated with at least one vested entity associated with the product units. The product information includes inventory data from a cabinet. The cabinet is configured to store one or more pharmaceutical units each configured with a corresponding one or more RFID tags, and monitor an inventory of the product units by wirelessly detecting the RFID tags. The pharmaceutical units comprising one or more pharmaceutical units are configured to treat an ailment of a patient.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with particular reference to the presented embodiments.

Embodiments of the present disclosure include a system and method for sharing product inventories with one or more entities vested in the use of the product for which the inventory is maintained. Various embodiments may use a product management cabinet that tracks or otherwise maintains an ongoing status of the product inventory, and a server that stores the product inventory for use by the one or more vested entities.

Figure 1:
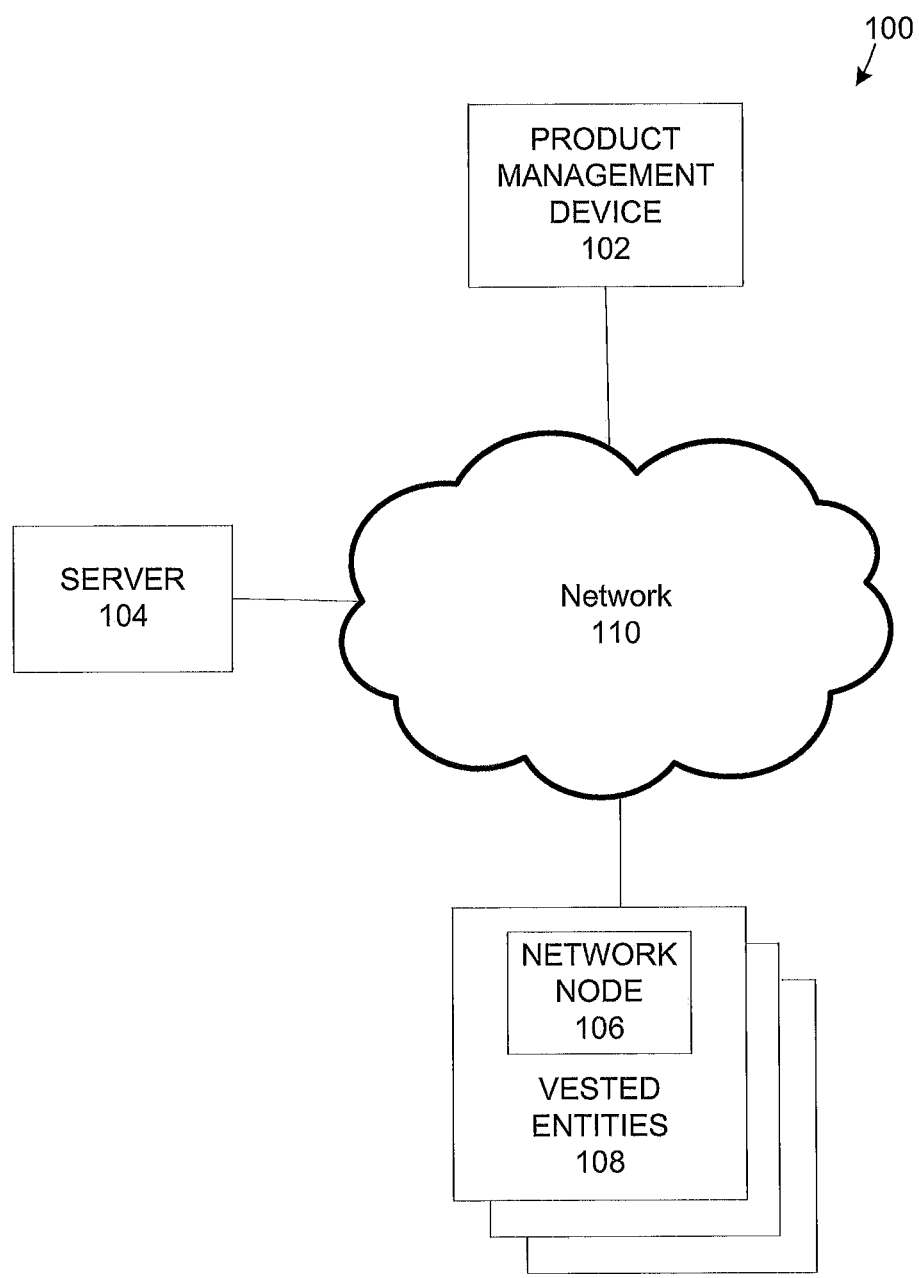
FIG. 1 illustrates an example network topology of a product inventory sharing system according to embodiments of the present disclosure.

FIG. 1 illustrates an example network topology of a product inventory sharing system 100 according to one embodiment of the present disclosure. Product information sharing system 100 includes a product management device 102, a server 104, and one or more network nodes 106 of one or more corresponding vested entities 108 that communicate through a network 110, such as the Internet. The product management device 102 stores and maintains an inventory of one or more product units. As will be described in detail below, the server 104 periodically receives product information from the product management device 102 through the network 110. The server 104 stores the product information, and transmits the product information to network nodes 106 associated with one or more vested entities 108 associated with the product units.

Products stored in product management device 102 may be any suitable type for which an ongoing, relatively up-to-date inventory may be maintained and shared with any entities vested in the product. In certain embodiments, the product may be a pharmaceutical product that treats an ailment of a patient. In a particular embodiment, the product may be pharmaceutical product that is adapted to treat chronic ailments of a patient, such as, for example, a patient diagnosed with hemophilia. In other embodiments, the product may include pharmaceutical products adapted for treatment of other types of ailments.

The vested entities 108 may include those entities having a vested interest in the use and administration of the product. For products such as pharmaceutical products, these vested entities may include a user of the pharmaceutical product (i.e., the patient), a payer of the pharmaceutical product (i.e., an insurance provider), a manufacturer of the pharmaceutical product, a caregiver who administers the pharmaceutical (i.e., a doctor), and a pharmacy that provides the pharmaceutical product to the patient.

Each vested entity 108 may receive up-to-date inventory information via its associated network node 106. The network nodes 106 may be any computing system having one or more processors that execute instructions stored in a memory. Examples of such a computing system include personal computers, mainframe computers, laptop computers, personal digital assistants, cellular telephones, and the like.

In one embodiment, the network node 106 used by a vested entity 108 may periodically receive product inventory information from the product management device 102 via the Server 104. In another embodiment, the network node transmits the product information to at least one vested entity associated with the product units in response to a request for the inventory information from the vested entity.

Access to the product information may be protected from illicit access via an authentication process. For example, the server 104 may use a password protected login session to restrict access to only registered vested entities 108. As another example, the server 104 may use a public-private key authentication architecture for automated, periodic access to information by network nodes used by each vested entity 108.

In certain embodiments, the server 104 may maintain an account for each vested entity such that the type and level of product information may be allocated independently for each vested entity 108. For an example in which the product is a pharmaceutical product, a payer of the product, such as a medical insurance provider, may wish to maintain an accurate status of the amount of product used for cost purposes, while a caregiver, such as a doctor, may wish to know symptoms associated with the use of the product. Thus, the account associated with the payer may be allocated to receive only product use information, while the caregiver may be allocated to receive product use information as well as any symptom related information associated with the use of the pharmaceutical product.

In certain embodiments, information transmitted through the network 110 may be encrypted to maintain its integrity and/or to thwart its illicit use. For example, the encryption of information may reduce the possibility of its modification by sniffing packets transmitted by the product management device 102 and spoofing these packets with illicit data. As another example, the information may be encrypted for compliance with certain governmental privacy requirements, such as the Health Insurance Portability and Accountability Act (HIPAA), which requires that only certain authorized entities have access to medical records of the patient that uses the product management device 102.

Network 110 can be implemented using any known networking technology, such as a public or private network or as direct communications, and is may be implemented using the Internet to communicate between each system. Network 110 can be implemented using multiple technologies, and can be implemented using multiple separate networks.

Although the product information sharing system 100 as shown and described includes a single product management device 102, other embodiments of the product information sharing system may include multiple product management devices 102. The server 104 may perform an overall inventory management functions for these multiple cabinets 100. In general, server 104 communicates with the product management device 102 to monitor its inventory on a regular basis. Server 104 can also monitor other status information of each product management device 102 according to one or more sensor devices configured in the product management device 102. Server 104 includes a database that maintains a current inventory of the product, the product inventory assigned to the product management device 102, and other information regarding the product management device 102.

Server 104 may also track all products from time of purchase and receiving into a warehouse, to shipment placement in the product management device 102, to storage in product management device 102, to removal from product management device 102. Server 104 will periodically receive communications from each product management device 102 including the current inventory list, the consumed product list, and other information. These communications can be initiated by server 104, by polling of the product management device 102, or can be initiated by the product management device 102.

Server 104 may include a web server interface to allow management using a standard web browser interface. At least some data sent and received by server 104 may be in extensible markup language (XML) format. Server 104 maintains at least one database for product inventory data, which in a particular embodiment, is a structured query language (SQL) database.

Server 104 can also generate billing and invoice data according to the reports from product management device 102 of a product that is delivered (added to the current inventory list) or consumed (added to the consumed inventory list).

In various embodiments, the server 104 may create an order to have additional product added to the product management device 102 according to its inventory. In some cases, the product in the inventory includes consignment product units, and the server 104 creates an invoice when the product is removed from the inventory. The server 104 may be further configured to, in some embodiments, receive status data from the product management device 102, and send control instructions to the product management device 102. The server 104 may be further configured to, in some embodiments, analyze product consumption data according to inventory data received from the product management device 102, as described below.

Although FIG. 1 illustrates one example product information sharing system 100 for sharing product information with one or more vested entities 108, various changes may be made to FIG. 1. For example, in some embodiments, product information may be stored in a memory configured in the product management device 102 and periodically downloaded to a portable memory device, such as a flash memory card, which is then physically transported to, and accessed by a network node of a vested entity such that the communication network may not be necessary. In other embodiments, for security reasons, the product information may not be stored in the product management device 102. In yet other embodiments, the product management device 102, server 104, and network nodes 106 administered by the vested entities 108 may exist as a single computing system in which communication of product information may be provided by internal system calls between each of its users.

Figure 2:
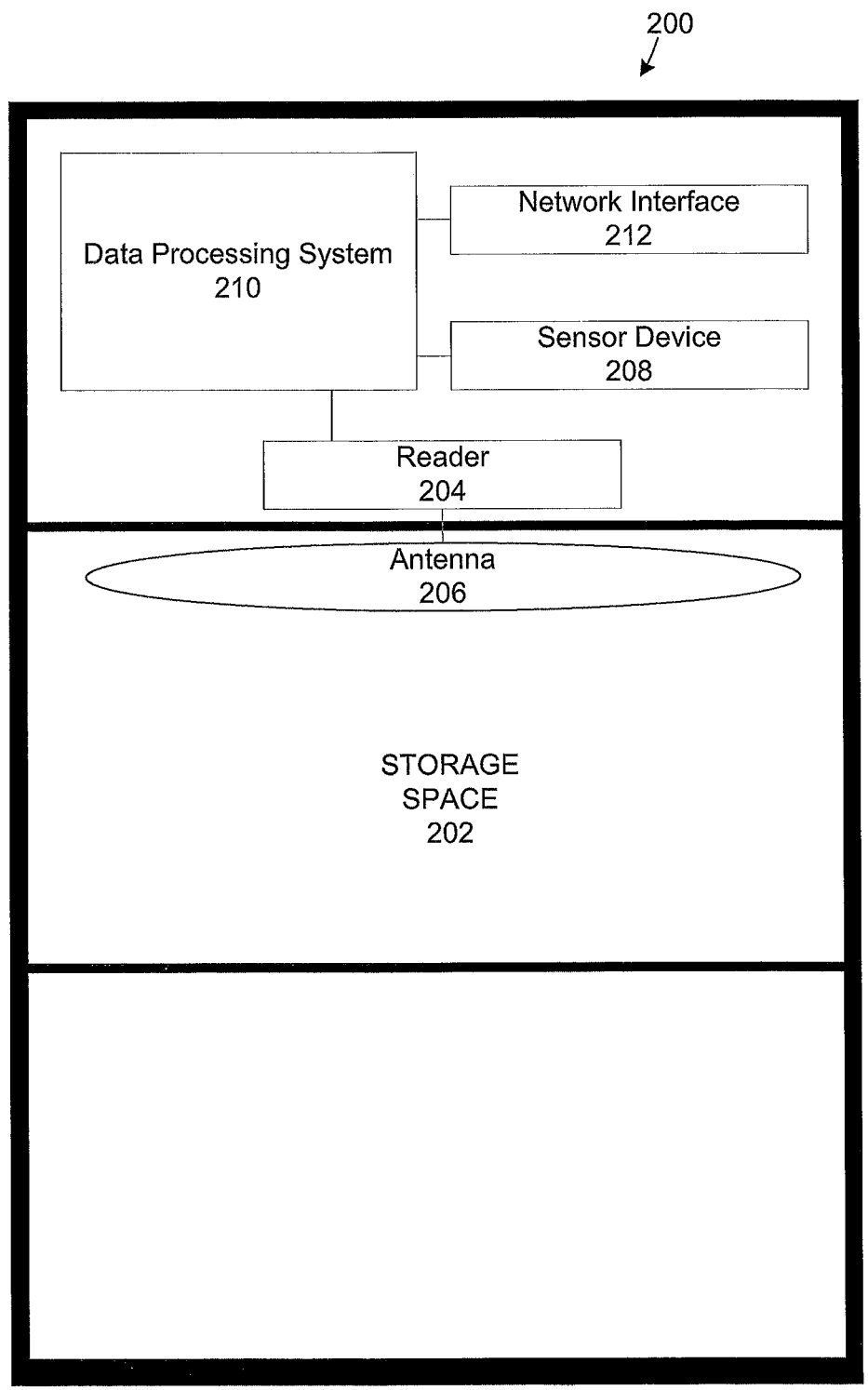
FIG. 2 illustrates an example cabinet according to embodiments of the present disclosure.
Figure 3:
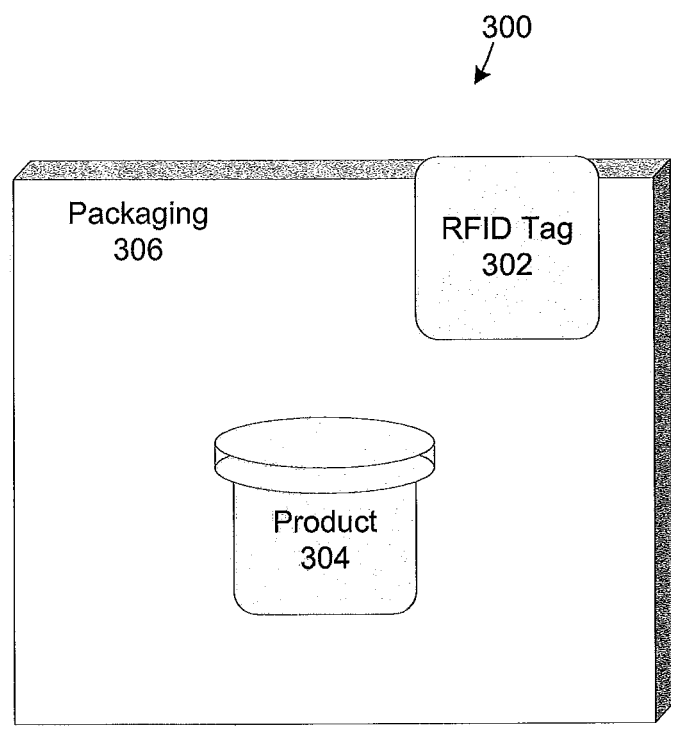
FIG. 3 illustrates an example product unit according to embodiments of the present disclosure.

FIG. 2 illustrates an example cabinet 200 according to the teachings of the present disclosure. In an embodiment, the cabinet 200 functions as the product management device 102 as described above with reference to FIG. 1. The cabinet 200 has an internal storage space 202 for storage of one or more product units 300 (FIG. 3). The cabinet 200 may include a refrigeration and/or heating system for maintaining a temperature of the storage space at any desired temperature. For refrigerated use, a conventional refrigerator unit can be modified as described herein. For ambient-temperature use, a non-refrigerated cabinet can be used, or the refrigeration unit can be turned off or disconnected.

The cabinet 200 also includes a reader 204 to wirelessly and automatically detect and identify the contents of the cabinet 200. In one embodiment, the reader 204 is a radio-frequency identification (RFID) reader. The cabinet 200 includes one or more RFID antennas 206 coupled to the RFID reader 204 that scans the contents of the cabinet.

The cabinet 200 also includes one or more optional sensor devices 208, such as a thermometer, a door-open sensor, a power-failure sensor and optional backup power supply, a GPS locating device, and other devices. In some embodiments, the cabinet 200 also has an attached RFID tag.

The cabinet 200 also includes a data processing system 210 that communicates with and controls the RFID reader 204. The cabinet data processing system 210 also includes communications software for communicating as described in detail below. The cabinet data processing system 210 also communicates with and controls the optional sensor devices 208 described above.

The data processing system 210 may be implemented using any appropriate technology and components, configured to operate as described herein. The cabinet data processing system 210 generally includes one or more processors and one or more memory units for storing data as described herein.

Cabinet also includes a network interface 212 for communication with other devices, such as the server 104 and/or network nodes 106 of vested entities 108 (See FIG. 1). The network interface 212 may be implemented using a wired communication medium such as an Ethernet or a telephone modem, or wireless communication medium such as a Global System for Mobile (GSM) communications architecture, Wi-Fi network (e.g., IEEE 802.11), a cable modem system, or any combination of these. In a particular embodiment, network interface 212 communicates using an Internet Protocol. Network interface 212 allows the cabinet data processing system 210 to communicate with the server 104, and optionally with other cabinets 200 using a mesh networking topology, direct cabling, or other technologies. Communications between cabinet data processing system 210 and the server 104 may be implemented using any suitable data communications technology, or any combination thereof. In embodiments where multiple cabinets 200 communicate with each other, they can be configured to communicate with the server 104 as a single unit with a combined inventory.

In use, the cabinet data processing system 210 performs periodic inventory scans, using the RFID reader 204, to uniquely identify each product unit 300 (See FIG. 3) stored in the cabinet. If a new identifier is found during any scan, the cabinet data processing system 210 notes the identifier and stores it to a current inventory list for that cabinet. Similarly, if a specific identifier is no longer detected during a periodic scan, because the product has been removed or the RFID tag has been damaged, the cabinet data processing system 210 notes the missing identifier and removes it from the current inventory list for the cabinet. The identifiers of such removed products are also stored in a "consumed product" list in the cabinet data processing system.

In this manner, the cabinet 200 is configured to monitor the inventory by wirelessly detecting the RFID tags. The cabinet performs a periodic wireless scan to determine the current product units in the inventory, and determines that a product unit has been removed from the inventory when the RFID tag corresponding to the product unit is not detected for a predetermined amount of time.

Of course, the references herein to the inventory list and consumed product list are not intended to specify a data structure for this information, as this information can be stored in any number of forms within the scope of the disclosed embodiments. The term "Lists" is simply used for convenient reference.

In certain embodiments, cabinet 200 may include a locking mechanism, or one or more individual locking compartments, to control access to the product. These locks can be any known technology, including key locks, digital keypad locks, biometric locks, etc. The locking device can also be opened remotely if the cabinet data processing system 210 receives such a command from a particular node of the product inventory sharing system 100.

The cabinet 200 may also include marketing or informational displays, either as a fixed display, or as a customizable electronic display. Similarly, the cabinet 200 can include a display connected to cabinet data processing system 210 that displays status or informational messages related to the status of the cabinet or the product inventory.

The cabinet 200 may include a power-failure detection device and a backup power supply. When a power failure is detected, the cabinet 200 may generate an audible alarm, and can communicate with the server 104 to notify the existence of a problem.

FIG. 3 illustrates an example product unit 300 according to the teachings of the present disclosure. The product unit 200 described herein is configured for storage of pharmaceutical products; however, the systems and methods described herein can be applied to other products. Each product unit 300 includes an RFID tag 302 affixed to the product or its packaging, where the RFID tag 302 includes identifying information capable of being read by the RFID reader.

In a typical implementation, an individual product unit 300 includes the product 304 itself in an appropriate packaging 306, such as a box. The packaging includes the RFID tag 302 that seals the package. The RFID tag has at least a unique identifier, such as a serial number, that can be read by the RFID reader. Preferably, to open the package 306 for use of the product 304, the RFID tag 302 is damaged, at which point it can no longer be read by the RFID reader.

For ease of reference, the term "serial number" will be used herein to refer to the unique identifier, although those of skill in the art will recognize that any suitable style of unique identifier can be used.

Although the product unit 300 generally represents a generic product, there can be one or more actual products 304 identified as a product unit 300, which are packaged together. For example, in the pharmaceutical context, a single dose, pill, or pre-filled syringe can comprise a single product 304, but multiple ones of these can be packaged together as a single product unit 300, depending on the requirements for using, dispensing, or billing for the product 304.

FIGS. 2 and 3 illustrate one example cabinet 200 and product unit 300, however, various changes may be made to FIGS. 2 and 3. For example, RFID tag 302 may wirelessly communicate with reader 204 of the cabinet 200 using any suitable protocol. Additionally, the packaging 320 may be any suitable type, such as a bottle, jar, or a disposable capsule for containing the product 304.

Figure 4:
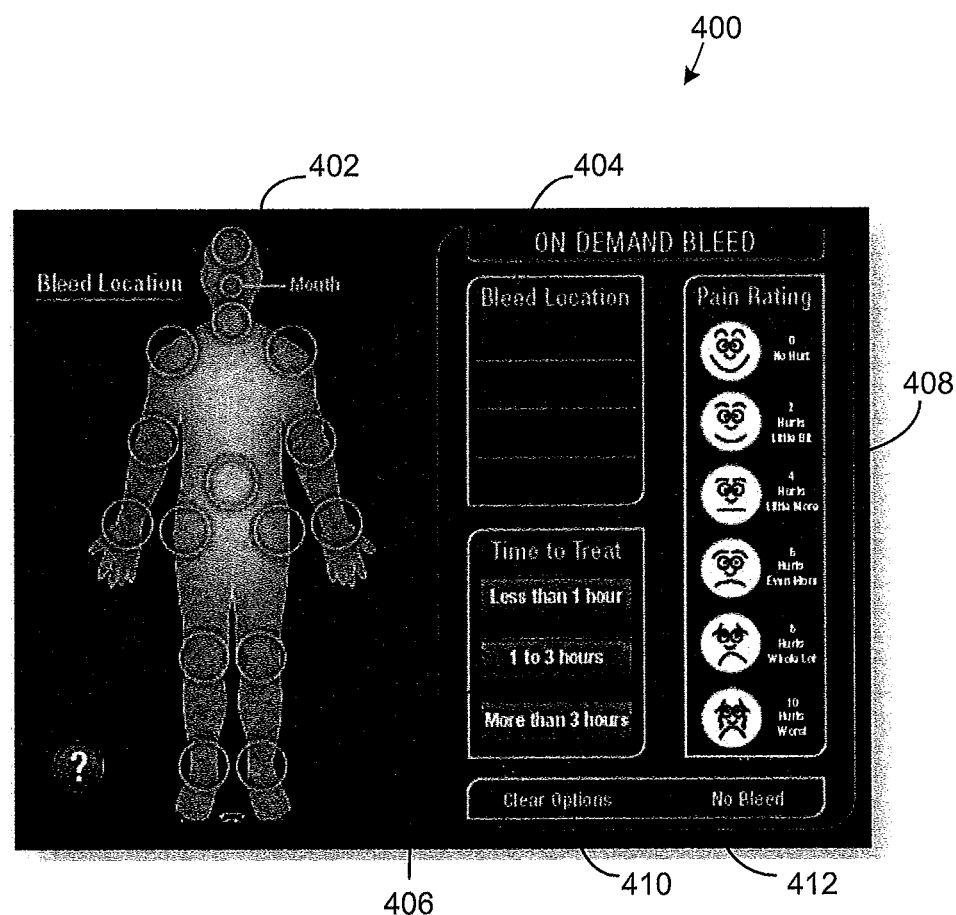
FIG. 4 illustrates an example user input device that may be used with the cabinet of FIG. 2 according to embodiments of the present disclosure.

FIG. 4 illustrates an example user input device 400 that may be used with the cabinet 200 of FIG. 2 according to one embodiment of the present disclosure. The user input device 400 may be disposed on an outer surface of the cabinet 200 and configured to receive patient data associated with one or more ailments of the patient. Entry of patient data may be provided by one or more fields 402, 404, 406, 408, 410, and 412 displayed on the user input device 400. The patient data may be stored by the server 104 and transmitted to network nodes 106 of the vested entities 108.

The user input device 400 may include a refreshable display device, such as a touch screen that receives input as well as provides a display under the control of a controller, such as the data processing system (See FIG. 2). The user input device 400 may be configured on a door of the cabinet for entry of patient data each time the door of the cabinet 200 is opened for access of one or more product units 300.

In an embodiment, the user input device 400 includes a Linux-based personal computing tablet that is installed on a refrigerator unit. Use of the personal computing tablet may provide a refreshable display of the user input device 400 for alternatively displaying different fields for corresponding different product units.

The cabinet 200 may include a door lock that maintains the door of the cabinet in a locked condition until all patient data is entered through the user input device 400. In this manner, a relatively quality level of patient data may be maintained for accurate analysis of the patient's condition.

As a failsafe feature, in the event of an emergency, such as a catastrophic fault of the data processing system 210, or a condition in which the patient is generally incoherent, the lock may be disabled such that access may be provided even when all patient data is not inputted into user input device 400. For example, the door lock may be biased in the unlocked position and locked only when electrical power is actively provided to the door lock. Thus, access to the inner space of the cabinet 200 may be provided by merely unplugging the power cord to the cabinet such that energizing power for locking the door of the cabinet is removed. When power is again applied at a later time, the RFID reader 204 may again rectify the inventory of product units 300 and send notification to one or more vested entities that the failsafe condition was used to access one or more product units.

The user input device 400 includes one or more fields that may be selected by the patient each time the patient desires to access a product unit from the cabinet 200. The example user input device 400 shown in FIG. 4 includes fields that provide entry of patient data that may be particularly beneficial for hemophiliac patients. Nevertheless, the user input device 400 may include fields that provide for entry of any suitable type of patient data.

With regard to the particular example user input device 400 shown, fields include a bleed location entry field 402, a bleed location display field 404, a time to treat field 406, a pain rating field 408, and several control buttons 410 and 412 that allow clearing of entered data in the fields and entry for a "no bleed" condition, respectively. Each of these entry fields is generally associated with a hemophiliac medical condition. Nevertheless, it should be understood that any suitable type and number of fields may be displayed on the user input device 400 for entry of patient data associated with any type of medical condition each time a product unit 300 (e.g., a pharmaceutical product) is accessed or removed from the cabinet 200.

Although FIG. 4 illustrates one example user input device 400 that may be used with the cabinet 200 of FIG. 2, various changes may be made to FIG. 4. For example, the user input device 400 may also be configured remotely from the cabinet 200 such that patient data, which is entered on the user input device 400, may be wirelessly transmitted to the data processing system. Alternatively, the user input device 400 may be electrically coupled to the cabinet via a cord, such as an Ethernet cable, in which patient data is transferred from the user input device 400 to the data processing system 210.

Figure 5:
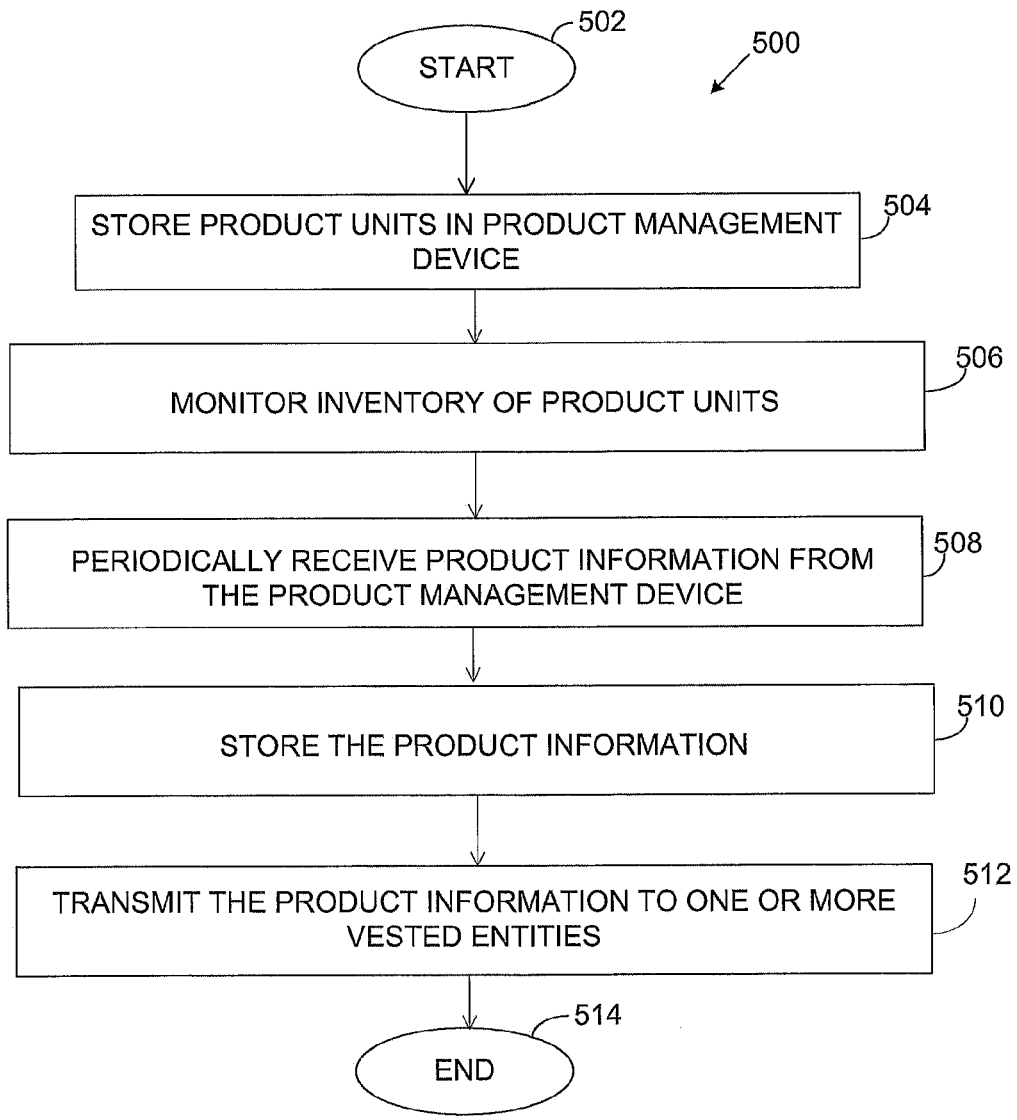
FIG. 5 illustrates an example process for sharing product information according to embodiments of the present disclosure.

FIG. 5 illustrates an example process for sharing product information according to certain embodiments of the present disclosure. In step 502, the process is initiated.

In step 504, one or more products units are stored in a product management device. The product management device may include a cabinet that is configured with a user input device for entry of patient information each time a product unit is removed from or added to the cabinet.

In step 506, the product management device monitors an ongoing inventory of the product units using RFID tags configured on each product unit stored in the cabinet. In one embodiment, the product units include a pharmaceutical product that is adapted to treat an ailment of a patient.

In step 508, a server in communication with the product management device periodically receives product information from the product management device. The product information may include inventory data associated with a quantity of product units currently in the cabinet as well as historical information associated with the previous removal of product units. The product information may also include patient data associated with one or more symptoms or medical conditions of the patient that is entered through the user input device each time a product unit is accessed by the patient.

In step 510, the server stores the obtained product information. The obtained product information may include inventory data, clinical data, or both. In one embodiment, patient data may be correlated with inventory data to generate additional information about a health or ongoing medical condition of the patient. For example, a rate of usage may be generated according to a quantity of pharmaceutical product used over a given period of time. As another example, patterns associated with certain periods of increased and/or decreased usage, such as increased usage during weekends, or decreased usage at nighttime may be determined according to the correlated patient data and inventory data. Using this additional information, vested entities, such as caregivers may provide enhanced medical treatment of the patient.

In one embodiment, the server may include a database for storage of the product information and patient information. The database may aggregate and organize the product information and patient information according to one or more criteria that may be useful to one or more of the vested entities. For example, the database may correlate an amount of medical product used by a particular patient with the patient's medical insurance information, and may further include triggers that send appropriate messages to a vested entity through the network, such as a payer of the product, when certain usage levels are exceeded.

As another example, the database may aggregate clinical data, including product information and patient information, in a manner useful to a caregiver (e.g., doctor) by correlating patient-specific data from a number of patients, such as how frequently each patient uses the medical product in relation to symptoms. In a specific example of a hemophiliac patient, the user input device may include fields for entry of patient information associated with bleed occurrences, location(s) of these bleed occurrences, and/or levels of pain during these bleed occurrences. The database may correlate such information with specific usage of the medical product such that the caregiver may identify ongoing patterns associated with specific locations of the patient's body, such as how quickly does the patient treat themselves in response to the occurrence, what level of pain is most common, and the like. Such ongoing patterns may be associated with one patient or across multiple patients. The information may be correlated in such a manner that would be useful to a caregiver for further diagnosis and/or treatment of each patient.

As yet another example, the database may aggregate the product information (including inventory data, clinical data, or both) in a manner useful to a manufacturer of the product. In a specific example in which the product is a medical product, the product information may be organized in a manner suitable for comparison with earlier clinical studies conducted during the development phase of the medical product, such as those studies conducted during development with mice or other non-human life-forms.

In step 512, the server transmits the product information to one or entities vested in the product units. Examples of vested entities may include a payer of the pharmaceutical product, a manufacturer of the pharmaceutical product, a caregiver who administers the pharmaceutical product, a pharmacy that provided the pharmaceutical product, and a user of the pharmaceutical product.

In one embodiment, a network node may include a portable wireless device, such as a cellular telephone or personal digital assistant (PDA), for remote entry of patient data. The network node may include executable software that displays fields for entry of patient data in a similar manner as shown in FIG. 4. Additionally, the executable software may include a mobile application ("app") that may be executed under an operating system, such as the Android™ operating system executed on the wireless device, such as a smartphone.

Certain embodiments of the wireless device configured with such a mobile app may provide accurate reporting and storage of patient data even when the patient does not have ready access to the cabinet for an extended period of time. For example, a patient wishing to go on vacation for an extended period of time may remove a sufficient quantity of product units that are anticipated to be used during the extended period of time. The portable wireless device may be configured with a user input screen similar to that shown above with respect to FIG. 4 such that, each time a dose of the pharmaceutical product is taken, the patient data may be entered into the portable wireless device and transmitted to the server.

In one embodiment, the server transmits the inventory information in response to a request for the inventory information from a network node associated with the vested entity. That is, the inventory information is transmitted to the vested entity upon a request for such information. In another embodiment, the server periodically transmits the inventory information to the network node of the vested entity. That is, the server may implement a push-type protocol in which product information is automatically transmitted to certain vested entities at recurring time periods. In either case, access to the product information may be restricted to an authentication process such that only qualified entities may receive such information.

Use of the product information sharing method as described above may be continued throughout medical treatment of the patient. When use of the product information sharing system is no longer needed or desired, the process ends in step 514.

While the present disclosure has been described in the context of a fully functional system, those skilled in the art will appreciate that at least portions of the mechanism of the present disclosure are capable of being distributed in the form of instructions contained within a machine usable medium in any of a variety of forms, and that the present disclosure applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the disclosure, as defined by the following claims.

What is claimed is:
1. A product inventory sharing system comprising:
 a product management device comprising:
  a cabinet configured to store one or more product units, each product unit configured with a corresponding one or more radio frequency identification (RFID) tags, each product unit comprising one or more pharmaceutical units configured to treat at least one ailment of at least one patient;

a user input device on an outer surface of the cabinet and configured to display one or more user input fields associated with the one or more product units stored in the cabinet and receive current patient symptom data associated with the at least one ailment of the at least one patient via the one or more user input fields, wherein the one or more user input fields are selected based on one or more types of the one or more product units stored in the cabinet, wherein different user input fields are associated with different types of product units; and an RFID reader configured to monitor an inventory of the one or more product units by wirelessly detecting the one or more corresponding RFID tags; and a server configured to:

periodically receive product information and the current patient symptom data from the product management device and receive additional current patient symptom data from a portable wireless device, the additional current patient symptom data received from the portable wireless device when the product management device is inaccessible to the at least one patient, the portable wireless device having a user input screen configured to (i) display one or more second user input fields that are the same as the one or more user input fields of the user input device of the product management device and (ii) receive the additional current patient symptom data, the product information comprising inventory data associated with the inventory of the one or more product units;

store the product information;

determine whether a pattern exists of increased or decreased usage of product units during certain time periods by correlating the current patient symptom data and the additional current patient symptom data with the inventory data over multiple periods of time; and transmit a portion of the product information to at least one network node associated with at least one vested entity that is associated with the one or more product units, wherein the portion of the product information is limited to at least one type of product information associated with an account type of the at least one vested entity.

2. The product inventory sharing system of claim 1, further comprising a data processing system disposed in the cabinet, wherein the data processing system is configured to maintain a door of the cabinet in a locked condition until the one or more user input fields have been entered by a user.

3. The product inventory sharing system of claim 1, wherein the at least one vested entity comprises one or more of:

a payer of at least one pharmaceutical unit;
a manufacturer of at least one pharmaceutical unit;
a caregiver who administers at least one pharmaceutical unit;
a pharmacy that provides at least one pharmaceutical unit; and
a user of at least one pharmaceutical unit.

4. The product inventory sharing system of claim 1, wherein:

the at least one ailment of the at least one patient is related to hemophilia; and the current patient symptom data and the additional current patient symptom data comprise bleed location information.

5. The product inventory sharing system of claim 1, wherein the server is configured to transmit the portion of the product information in response to a request from the at least one network node of the at least one vested entity.

6. The product inventory sharing system of claim 1, wherein the server is configured to periodically transmit the portion of the product info' illation to the at least one network node of the at least one vested entity.

7. The product inventory sharing system of claim 1, wherein the server is configured to correlate the current patient symptom data and the additional current patient symptom data with the inventory data to generate additional information about a health of the at least one patient.

8. A product inventory sharing method comprising:

storing, in a cabinet, one or more product units, each product unit configured with a corresponding one or more radio frequency identification (RFID) tags, each product unit comprising one or more pharmaceutical units configured to treat at least one ailment of at least one patient;

displaying, at a user input device on an outer surface of the cabinet, one or more user input fields associated with the one or more product units stored in the cabinet, wherein the one or more user input fields are selected based on one or more types of the one or more product units stored in the cabinet, wherein different user input fields are associated with different types of product units;

receiving, at the user input device, current patient symptom data associated with the at least one ailment of the at least one patient via the one or more user input fields;

monitoring an inventory of the one or more product units by wirelessly detecting the one or more corresponding RFID tags;

periodically receiving product information and the current patient symptom data from the cabinet, the product information comprising inventory data associated with the inventory of the one or more product units;

receiving, when the cabinet is inaccessible to the at least one patient, additional current patient symptom data from a portable wireless device, the portable wireless device having a user input screen configured to (i) display one or more second user input fields that are the same as the one or more user input fields of the user input device of the cabinet and (ii) receive the additional current patient symptom data;

storing the product information;

determining whether a pattern exists of increased or decreased usage of product units during certain time periods by correlating the current patient symptom data and the additional current patient symptom data with the inventory data over multiple periods of time; and transmitting a portion of the product information to at least one network node associated with at least one vested entity that is associated with the one or more product units, wherein the portion of the product information is limited to at least one type of product information associated with an account type of the at least one vested entity.

9. The product inventory sharing method of claim 8, further comprising:

maintaining a door of the cabinet in a locked condition until the one or more user input fields have been entered by a user.

10. The product inventory sharing method of claim 8, wherein the at least one vested entity comprises one or more of:
- a payer of at least one pharmaceutical unit;
- a manufacturer of at least one pharmaceutical unit;
- a caregiver who administers at least one pharmaceutical unit;
- a pharmacy that provided at least one pharmaceutical unit; and
- a user of at least one pharmaceutical unit.

11. The product inventory sharing method of claim 10, further comprising receiving clinical data.

12. The product inventory sharing method of claim 8, wherein the portion of the product information is transmitted in response to a request from the at least one network node of the at least one vested entity.

13. The product inventory sharing method of claim 8, wherein the portion of the product information is transmitted periodically to the at least one network node of the at least one vested entity.

14. The product inventory sharing method of claim 8, further comprising:
- correlating the current patient symptom data and the additional current patient symptom data with the inventory data to generate additional information about a health of the at least one patient.

15. A product inventory sharing system comprising:
a server configured to:
- periodically receive product information and current patient symptom data associated with at least one ailment of at least one patient from a cabinet, the cabinet configured to store one or more product units, each product unit configured with a corresponding one or more radio frequency identification (RFID) tags, each product unit comprising one or more pharmaceutical units configured to treat the at least one ailment of the at least one patient, the product information comprising inventory data associated with an inventory of the one or more product units in the cabinet, the current patient symptom data received at a user input device on an outer surface of the cabinet;
- select one or more user input fields based on one or more types of the one or more product units in the cabinet and transmit the one or more user input fields to the user input device for display by the user input device, the current patient symptom data received in response to input by a user in the one or more user input fields, wherein different user input fields are associated with different types of product units;
- receive, when the cabinet is inaccessible to the at least one patient, additional current patient symptom data from a portable wireless device, the portable wireless device having a user input screen configured to (i) display one or more second user input fields that are the same as the one or more user input fields of the user input device of the cabinet and (ii) receive the additional current patient symptom data;
- store the product information;
- determine whether a pattern exists of increased or decreased usage of product units during certain time periods by correlating the current patient symptom data and the additional current patient symptom data with the inventory data over multiple periods of time; and
- transmit a portion of the product information to at least one network node associated with at least one vested entity that is associated with the one or more product units, wherein the portion of the product information is limited to at least one type of product information associated with an account type of the at least one vested entity.

16. The product inventory sharing system of claim 15, wherein the at least one vested entity comprises one or more of:
- a payer of at least one pharmaceutical unit;
- a manufacturer of at least one pharmaceutical unit;
- a caregiver who administers at least one pharmaceutical unit;
- a pharmacy that provides at least one pharmaceutical unit; and
- a user of at least one pharmaceutical unit.

17. The product inventory sharing system of claim 15, wherein the server is further configured to receive clinical data.

18. The product inventory sharing system of claim 15, wherein the server is configured to transmit the portion of the product information in response to a request for the product information from the at least one network node of the at least one vested entity.

19. The product inventory sharing system of claim 15, wherein the server is configured to periodically transmit the portion of the product information to the at least one network node of the at least one vested entity.

20. The product inventory sharing system of claim 15, wherein the server is configured to correlate the current patient symptom data and the additional current patient symptom data with the inventory data to generate additional information about a health of the at least one patient.

21. The product inventory sharing system of claim 15, wherein the server is configured to:
- use the received product information to correlate an amount of the one or more product units used by a specified patient of the at least one patient with insurance information of the specified patient; and
- send a message to an entity associated with the insurance information when the amount of the one or more product units used by the specified patient exceeds a threshold.

* * * * *